FORMAT SCHEME FOR VIDICON SCANNERS

Filed Jan. 13, 1969 3 Sheets-Sheet 1

INVENTOR
MAURICE R. BARTZ

BY

Sughrue, Rothwell, Mion, Zinn & Macpeak
ATTORNEYS

United States Patent Office

3,509,415

Patented Apr. 28, 1970

3,509,415

FORMAT SCHEME FOR VIDICON SCANNERS

Maurice R. Bartz, Rochester, Minn., assignor to International Business Machines Corporation, Armonk, N.Y., a corporation of New York Filed Jan. 13, 1969, Ser. No. 790,617

Int. Cl. G06k 9/04

U.S. Cl. 315—19 11 Claims

ABSTRACT OF THE DISCLOSURE

A format pre-scanning scheme which measures the center line location and average height of each line of characters within a pre-established field. As the line of characters is scanned by a series of vertically spaced horizontal scans, the interceptions of the characters cause bursts of high frequency video pulses. These pulses are applied to the input of a filter having a time constant equal to the time required to complete the series of horizontal scans of a single line of characters. The filtered video output is a single smooth pulse whose point of greatest magnitude occurs at the time of interception of the approximate center of the line of characters, and whose points of maximum rate of change of magnitude occur at the interceptions of the approximate top and bottom of the line. These three points are detected and used to trigger devices which store analog voltage representations of the positions of the top, center and bottom of the line.

BACKROUND OF THE INVENTION

Field of the invention

The invention relates generally to the field of optical character recognition systems, and more particularly to a format pre-scanning system which eliminates video noise caused by the discharge of the face of a cathode ray scanning tube.

Prior art

Pre-look or pre-scan systems are commonly employed in character recognition systems to derive and supply information relative to character location, dimensions, density, etc. for subsequent use during a recognition scan.

Prior art format pre-scan systems in a character recognition system use a scan pattern which has a random nature; that is, the scan pattern is dependent on the particular data being scanned and is different for each field being scanned. Such random format pre-scan schemes cannot be used with vidicon tube scanners because the electronic image stored on the scanning surface thereof would be partially discharged only in the random areas covered by the format scan. These partially discharged areas would then cause noise during the subsequent recognition scan.

SUMMARY OF THE INVENTION

This invention may be broadly summarized as a format pre-scanning scheme utilizing a cathode ray tube having a scan pattern that is independent of the particular type of data being scanned but still makes the necessary format measurements. The scanning beam used in the format pre-scan begins its scan pattern at the top of the usable area or window of a scanning system having a field of characters to be read. The entire scanning window of the tube is covered by a series of closely spaced horizontal scans extending the full width of the window. This uniform coverage of the entire scanning window results in a slight uniform electrical discharge over its entire area, and, therefore, no noise is introduced into the video to interfere with the recognition scan. A set of voltage discriminators is used to determine when the scanning beam is inside the boundaries of the specific character field to be read. During this time the gate of a gated filter is open. The input to this filter is a series of high frequency pulses corresponding to the video information resulting from the scanning beam's intercepting the lines of characters of the field. The time constant of the filter is adjusted to be approximately equal to the time required for the scanning beam to make a complete vertical scan of the line of characters. The output of the filter is a single output pulse corresponding to a burst of input video pulses having all high frequency peaks filtered out. This output pulse is analyzed to determine the top, center and bottom of the line of characters, and analog storage circuits are used to store analog voltage which represent the positions of these three points within a character field.

DESCRIPTION OF THE INVENTION

A specific embodiment of the invention will now be disclosed with reference to the accompanying figures.

Figure 1:
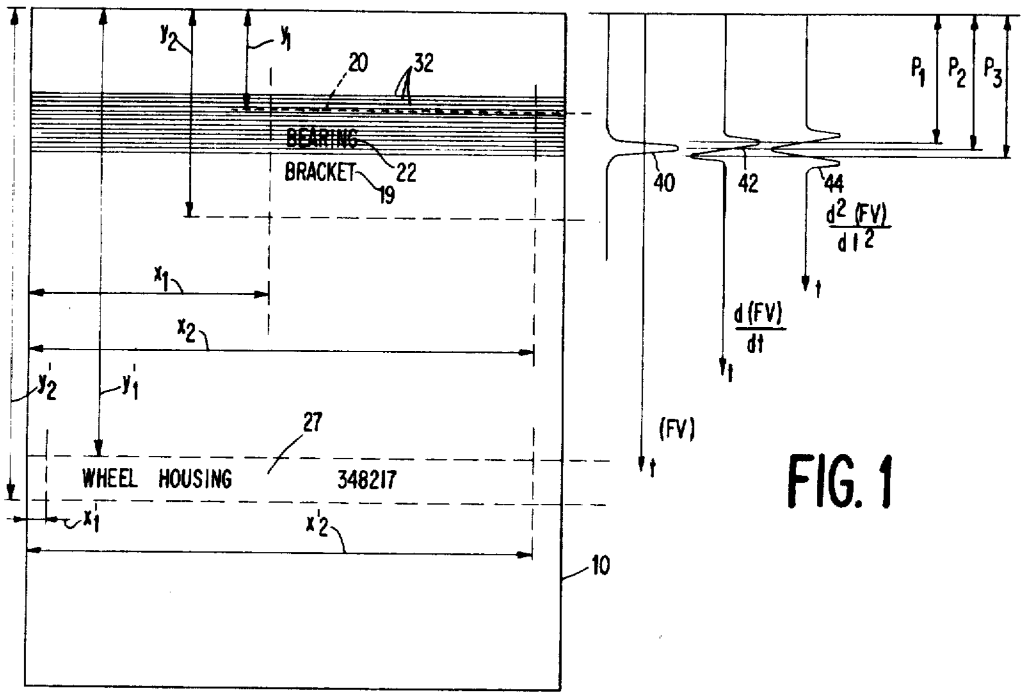
FIGURE 1 shows the full scanning window, the boundaries of the character field, and the waveform outputs resulting from the interceptions of the characters by the horizontal scans.

Referring to FIGURE 1, the scanning window of a vidicon scanning tube is shown. Although the specific embodiment disclosed is directed toward vidicon scanning, the system disclosed could be used effectively in cathode ray tube scanners as well as other scanning tubes. Three lines of characters, 19, 22 and 27, appear on scanning window 10, but it would be apparent to one of ordinary skill in the art that a multiple number of lines of characters may be scaned by this technique. It is also apparent that this system is format independent; that is, this system will develop and store analog voltage representations of the top, center, and bottom of any line of characters imaged upon the vidicon screen, whether the information is composed of letters, numbers or a combination thereof, or is printed in a specialized format.

Within the scanning window 10 a specific field of characters 20 is described by a set of rectangular co-ordinates $X_1$, $Y_1$, $X_2$ and $Y_2$ where Y co-ordinates represents displacement in the vertical direction and $x$ co-ordinates represent displacement in the horizontal direction. These field co-ordinates will be pre-set in the format pre-scan system either manually or by a central processing unit, and will be represented in the form of analog voltages. These voltages are to be used, as will be more specifically described, to limit the information input to the pre-scanning system to the specified character field. The size of the character field shown in FIG. 1 is only exemplary; it may be expanded to cover as much of the available scanning window as is required by a particular usage.

A field of characters defined by $X_1'$, $Y_1'$, $X_2'$, $Y_2'$ is also shown in FIGURE 1. The line of characters 27 contained in this field is severely skewed. If a particular embodiment requires that the degree of skew be determined, this can be done by dividing the field into halves horizontally and measuring the center line location in the left and right fields independent of each other. This may be accomplished by a substantial duplication of the circuitry necessary to make a single set of center line and character height measurements.

The format pre-scan consists of a series of horizontal scans 32 covering the entire width of the scanning window 10. In this exemplary embodiment the center line separation between horizontal scans is 0.005 inch.

When character information is intercepted within the prescribed character field by a horizontal scan, a burst of high frequency energy is generated. As a full line of characters 22 is intercepted by a series of horizontal scans 32, an output curve such as is shown at 40 will result. This curve which has been filtered of high-frequency components by a filter to be shown and described below, represents the total energy generated during the format prescan of the line of characters 22. Curve 42 is the first derivative of curve 40; this first derivative is equal to zero at the time that the scan passes the approximate center line of the characters, this being the point at which the slope of curve 40 is zero. The second derivative 44 of curve 40 represents the rate of change of the slope of that curve; the two zero intercepts of this curve 44 indicate the points in time, and vertical position, at which the vidicon beam intercepts the average top and bottom of the line of characters subject to pre-scanning.

Figure 2:
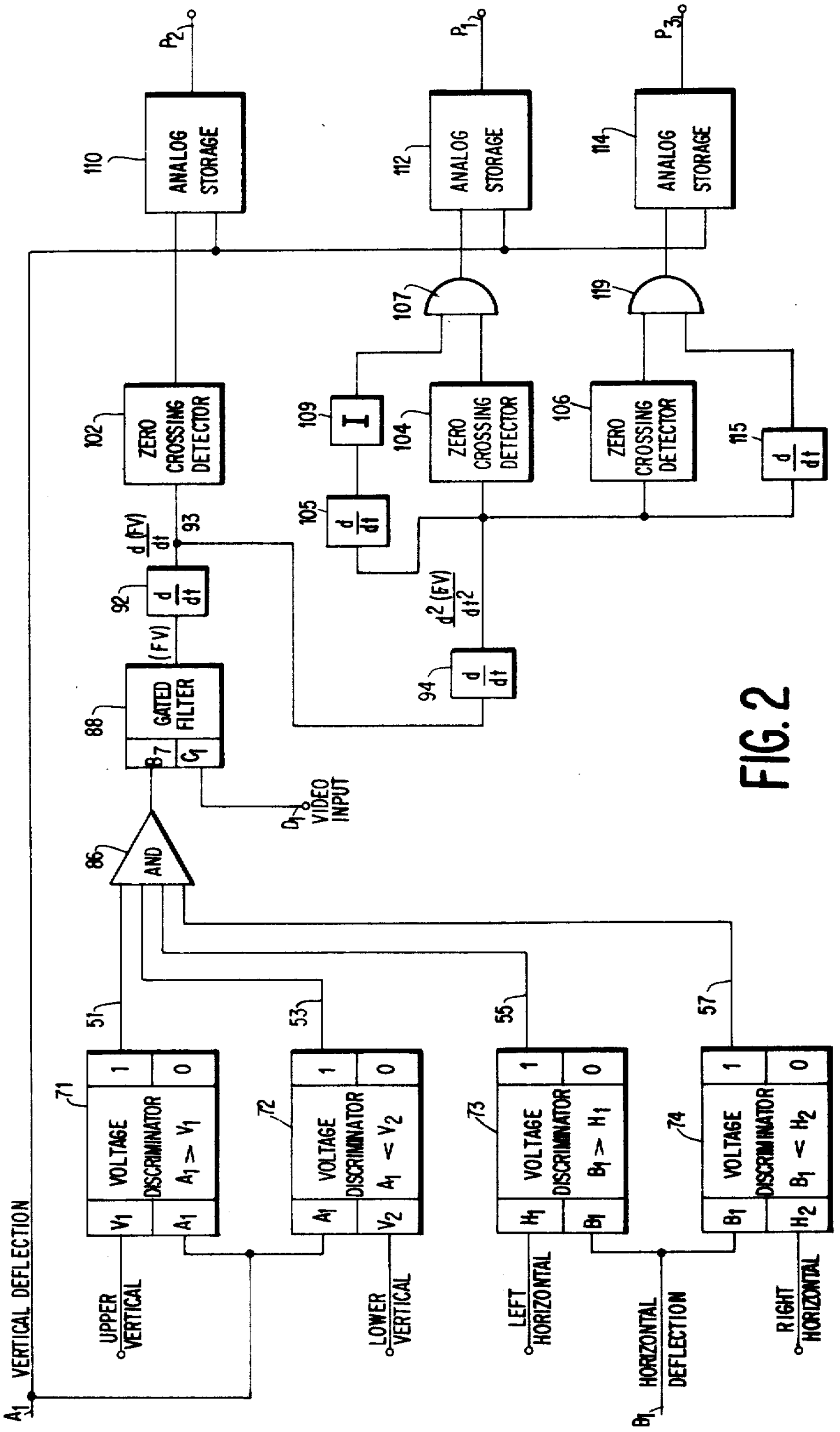
FIGURE 2 is a block diagram of the format pre-scanning system.

FIGURE 2 is a block diagram of the format prescanning system. The system comprises a set of voltage discriminators 71, 72, 73 and 74 and AND gate 86 which cooperate to gate the video signal input $D_1$ into gated filter 88 when the vidicon beam is scanning character field 20; differentiators 92 and 94 whose outputs are the first and second derivatives of the output of filter 88, and zero crossing detectors 102, 104 and 106 which determine the position of the center line and average top and bottom of the line of characters scanned and gate analog representations thereof into storages 110, 112 and 114. This format pre-scanning system will now be more particularly described with reference to these components.

Vertical deflection voltage $A_1$ is a ramp voltage used to drive the vertical deflection coils of a vidicon tube (not shown) in a manner well known in the art. Analog voltages $V_1$ and $V_2$ represent, respectively, the upper and lower limits of character field 20. As the vidicon scanning beam is driven vertically down scanning window 10 by input ramp voltage $A_1$, this deflection voltage is being compared continuously to analog voltages $V_1$ and $V_2$ by voltage discriminators 71 and 72. These voltage discriminators, which are conventional threshold devices of a suitable design, yield a one or up level output when the result of the comparison indicates that the vidicon beam is within the boundaries their reference voltages establish. In this embodiment, discriminator 71 requires a deflection voltage $A_1$ exceeding reference voltage $V_1$ to switch on its up level output 51, indicating that the beam is scanning below the upper limit $Y_1$ of the character field 20. Discriminator 72 establishes the lower limit $Y_2$ of the character field 20; its output 53 is an up level until the magnitude of ramp input $A_1$ exceeds reference $V_2$; the up level output is switched off, indicating that the scan is now outside the character field. In similar fashion analog voltage input $H_1$ of discriminator 73 establishes the left-hand boundary $X_1$ of the character field, and voltage $H_2$ establishes the right hand boundary $Y_2$; the magnitude of the sawtooth horizontal deflection voltage $B_1$ must be within these two limits to produce an up level output from discriminators 73 and 74.

When the four outputs 51, 53, 55 and 57 of discriminators 71, 72, 73 and 74 respectively, are up levels, AND gate 86 produces an up level. This output serves as the enabling pulse at input B7 for gated filter 88. This gated filter, whose circuit is described in detail below, is now enabled to accept the video signals impressed at video input $C_1$ by the scanning beam sweeping across the character field. This video signal information consists of a burst of high frequency pulses generated by the scanning beam intercepting a line of characters 22. A similar burst results each time the line of characters is intercepted by the scanning beam. This filter 88 has a time constant equal to the length of time required for the scannnig beam, which is sweeping in a horizontal direction, to make a complete vertical scan of the line of characters. In this specific example the length of time required for the number of horizontal scans which make up a complete vertical scan of a line of characters in 800$\mu$ seconds; the time constant of the filter is therefore set at 800$\mu$ seconds. As the scan progresses vertically down through the line of characters, each interception of the line generates a new burst of high frequency pulses. Because of the long time required to charge the filter, no single pulse burst but rather a series of bursts occur during the charging time and are applied to the filter input. As the filter slowly discharges, the filtered video output FV will be a smooth pulse devoid of any high frequency noise interference. The vertical position of the average center line of a line of characters is indicated by the maximum output FV of filter 88, i.e. where the slope of curve 40 is zero. And the vertical position of the average top and bottom of the line of characters are the points where the rate of change of the slope of output curve 40 is zero, for this is the time of occurrence of the first and last horizontal scans to intercept the characters.

To store an analog representation of the center of a line of characters the combination of differentiator 92, zero crossing detector 102, and analog storage 110 is employed. The input to zero crossing detector 102 will be the first differential of filter output FV, as shown in curve 42. Zero detector 102 is of conventional design, providing a pulse output to enable the gate of analog storage circuit 110 when the magnitude of curve 42 is equal to zero. Storage circuit 110 is a conventional track and hold circuit of suitable design. The circuit tracks the vertical deflection coil voltage appearing at input $A_1$. When enabled by a digital signal, the instantaneous value of this input ramp voltage as it appears at $A_1$ is gated into a suitable storage device (e.g. a capacitor) to provide an analog representation $P_2$ of the vertical location of the center of the line of character.

This differentiated output 93 is also the input to conventional differentiator 94, whose output signal will, as explained above and as shown by curve 44, contain two zero points. These zero points will be detected by zero crossing detectors 104 and 106 which provide the enabling signals to the gates of analog track and store circuits 112 and 114.

Inspection of curve 42 reveals that the first zero crossing point, that which corresponds to the average top of the line of characters, occurs on a negative slope of the curve. The AND gate 107 will be enabled only by a negative pulse output from differentiator 105 (indicating a negative slope of curve 44), as inverted by inverter 109, when the negative-going portion of curve 44 passes through zero. When the slope of this curve 44 is positive and passes through zero, AND gate 119 alone will be enabled. This checking circuitry is to prevent analog stores 104 and 106 from storing analog representations of both zero points. An analog representation of the average vertical top position $P_1$ and average vertical bottom position $P_3$ will be stored in storages 112 and 114 respectively.

Figure 2A:
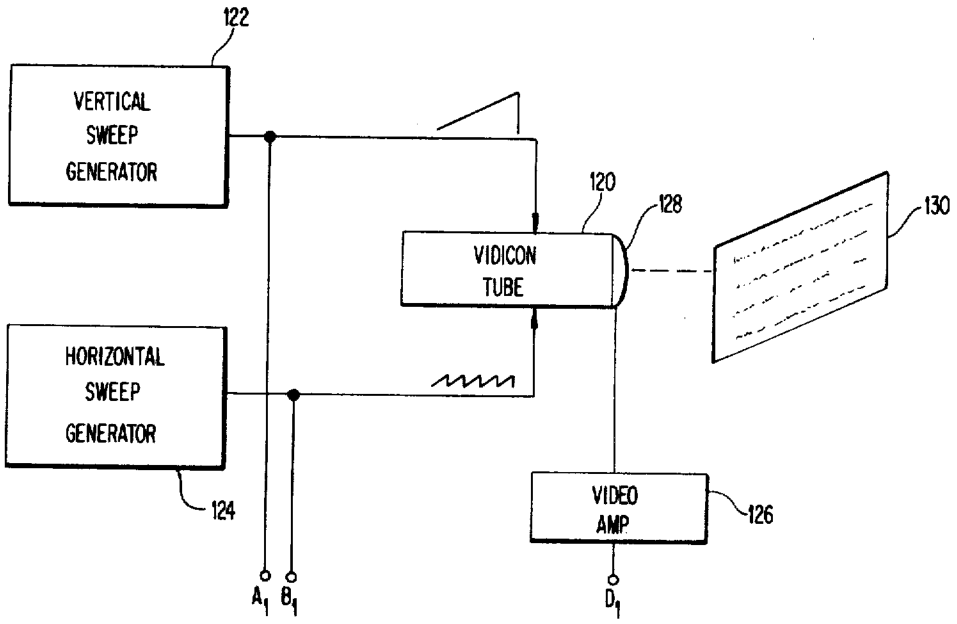
FIGURE 2A is a block diagram of a vidicon tube scanning system.

FIGURE 2A shows a typical vidicon tube scanning system which may be employed to supply the vertical deflection signal $A_1$, the horizontal deflection signal B1 and the video signal $D_1$ shown as inputs in FIGURE 2. The scanning system includes a vidicon tube 120, a vertical sweep generator 122 for generating the vertical deflection signal in the form of a ramp waveform, a horizontal sweep generator 124 for generating the horizontal deflection signal in the form of a sawtooth waveform, and an amplifier 126 for amplifying the video output from the sensitized face 128 of the vidicon tube. Reference numeral 130 represents the document being scanned.

Figure 3:
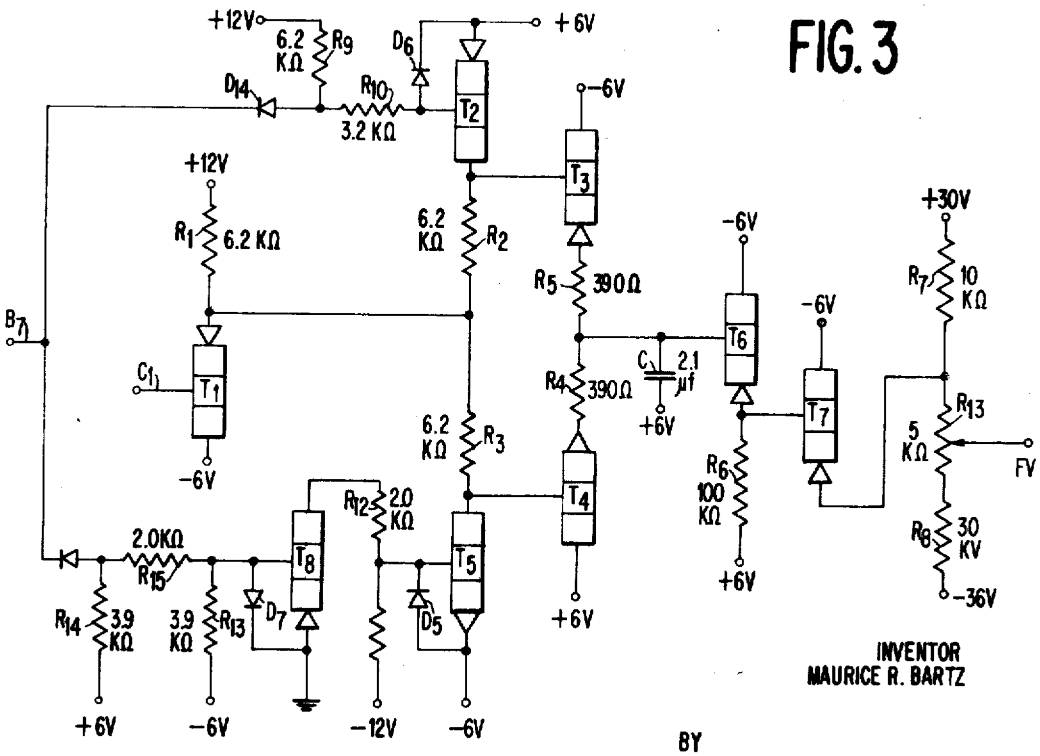
FIGURE 3 is a schematic circuit of a gated filter for use in the pre-scanning system.

FIGURE 3 is a schematic diagram of the gated filter 88 which will now be described with reference to particular circuitry details. The input $C_1$ is a series of bursts of high frequency video pulses representing interceptions of the line of characters. An RC filter consisting of capacitor C and resistor R4 or R5 and having a time constant of 800$\mu$ seconds is used to filter these high frequency bursts; and since the time constant is large in comparison to the time required to complete a single horizontal scan of the line of characters the filter output will be a smooth curve having only a slight high frequency ripple. The filter will be charged through charging transistors $T_3$ and $T_4$; the filter will discharge through discharge transistors $T_6$ and $T_7$ which also maintain the leakage current at a low level.

The video signal input $C_1$ (which is the beam curent output of the vidicon tube) is always on the emitter of emitter follower connected transistor $T_1$. Switching transistors $T_2$ and $T_5$ comprise a gating section to turn on the RC filter network whenever a gating signal appears at digital control input $B_7$. Two charging transistors are used, $T_3$ being type PNP and $T_4$ type NPN so that the capacitor can be charged both positively and negatively.

Transistors $T_2$ and $T_5$ are biased on when gate input $C_7$ is grounded; their collectors are switched to $T_6$ volts ($T_2$) and $-6$ volts ($T_5$) which reverse biases $T_3$ and $T_4$ with the result that the voltage on capacitor C is held constant.

At this time voltage on capacitor C will be constant or leaking off slightly through the base of $T_6$. Transistors $T_6$ and $T_7$ are designed to maintain this leakage current at a low level as well as act as output drivers. The 5000 ohm potentiometer, R13, can be set to compensate for the slight phase shift, or roll-off, which results from the time constant of this first-order RC circuit.

An input signal at gate $B_7$ (of least +3 volts) will turn off transistor $T_2$ and after inversion by inverter transistor $T_8$ turn off $T_5$ ($T_5$ being an NPN transistor). Emitter followers $T_4$ and $T_5$ can now charge capacitor C with the output signal of $T_1$ appearing across load resistors $R_2$ and $R_3$.

Diodes $D_5$, $D_6$ and $D_7$ clamp the base voltages of their associated transistors and prevent the relatively low reverse breakdown voltages thereof from being exceeded. Diodes $D_{12}$ and $D_{14}$ are used to control the current through the biasing networks of transistors $T_2$ and $T_8$.

While the invention has been particularly shown and described with reference to preferred embodiments thereof, it will be understood by those skilled in the art that various changes in form and details may be made therein without departing from the spirit and scope of the invention.

What is claimed is:

1. On a format system using a scanning tube beam for pre-scanning a line of characters imaged on a scanning window of the tube, the combination comprising (a) means for scanning said line of characters by a series of closely spaced horizontal scans and for generating a burst of high frequency pulses corresponding to each interception of the line of characters by said scanning beam, (b) filter means having a time constant which is very large in comparison to the time required to complete a single horizontal scan and responsive to said high frequency bursts for generating an output pulse having a maximum amplitude at the time the scanning beam intercepts the center of said line of characters.

2. A system as claimed in claim 1 wherein said output pulse has a local maximum rate of change of amplitude at the time of interception of the top and bottom of said line of characters.

3. A system as claimed in claim 1 wherein said filter means comprises an RC series filter.

4. A system as claimed in claim 1 wherein said filter means has a time constant whose duration is as great as the time required to make a complete vertical scan of one of said lines of characters.

5. A system as claimed in claim 1 further comprising gating means for generating a field signal for activating said filter means when the scanning beam is positioned within a character field in said scanning window, wherein said gating means comprises;

a plurality of voltage discriminating means, each having first and second inputs, means for coupling an analog voltage representing a boundary of a specific character field occupying a part of the total scanning window to each of said first inputs, means for coupling an analog voltage representing the position of said scanning beam within said scanning window to each of said second inputs, pulse generating means coupled to said voltage discriminators for producing said field signal indicating that the scanning beam is within said character field.

6. A system as claimed in claim 1 wherein said scanning means is a vidicon tube.

7. In a format system using a scanning tube beam for determining and storing analog voltage representations of the location of the top, center and bottom of a line of characters imaged on a scanning window, the combination comprising (a) means for scanning the line of characters by a series of closely spaced horizontal scans and for generating a burst of high frequency pulses for each interception of one of said lines of characters by said scanning beam, (b) filter means having a time constant greater than the time required to make a horizontal scan and responsive to said high frequency burst of pulses for generating an output pulse having a maximum amplitude at the time of interception of the center of a line of characters and having a maximum rate of change of amplitude at the time of interception of the top and bottom of said line of characters, (c) means responsive to said output pulse for generating gating signals at the time of interception of the top, center and bottom of said line of characters, and (d) gated storage means responsive to said gating signals for storing analog representations of the locations of the top, center and bottom of said line of characters.

8. A system as claimed in claim 7 wherein said filter means has a time constant as great as the time required to make a complete vertical scan of a line of characters.

9. A system as claimed in claim 7 wherein said means for generating gating signals comprises (a) first differentiator means coupled to the output of said filter means for generating a first waveform proportional to the slope of said output pulse (b) second differentiator means coupled to the output of said filter means for generating a second waveform proportional to the rate of change of slope of said output pulse (c) first zero detector means responsive to the said first waveform output for detecting the center of said line of characters whereby a gating signal is generated to enable said gated storage means and (d) second zero detector means responsive to said second waveform output for detecting the top and bottom of a line of characters whereby gating signals are generated to enable said gated storage means, so that analog voltage representations of the position of the top, center and bottom of a line of characters are stored.

10. A system as claimed in claim 7 further comprising detecting means for generating a field signal indicating to said filter means that said scanning beam is within the boundaries of a pre-established character field, said field comprising a part of the scanning window.

11. A system as claimed in claim 7 wherein said scanner is a vidicon tube.

References Cited

UNITED STATES PATENTS

| | | | |
|---|---|---|---|
| 3,104,371 | 9/1963 | Holt | 340—146.3 |
| 3,164,806 | 1/1965 | Rabinow | 340—146.3 |
| 3,432,673 | 3/1969 | Mader | 340—146.3 |

RICHARD A. FARLEY, Primary Examiner

J. G. BAXTER, Assistant Examiner

U.S. Cl. X.R.

340—146.3